May 29, 1945.   M. SCHWARTZ ET AL   2,376,982
RANGE FINDER FOR CAMERAS
Filed Nov. 10, 1941   4 Sheets-Sheet 4
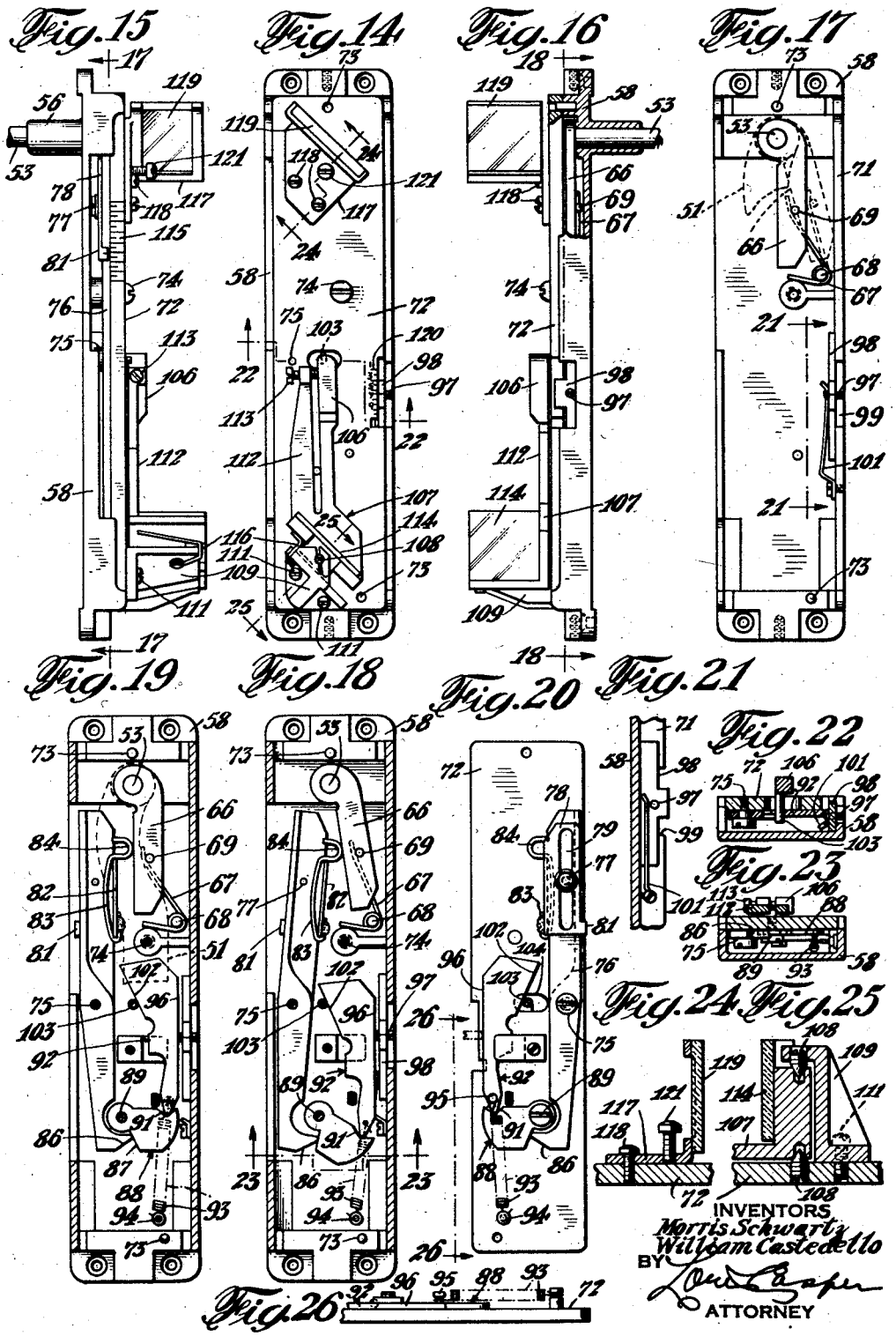

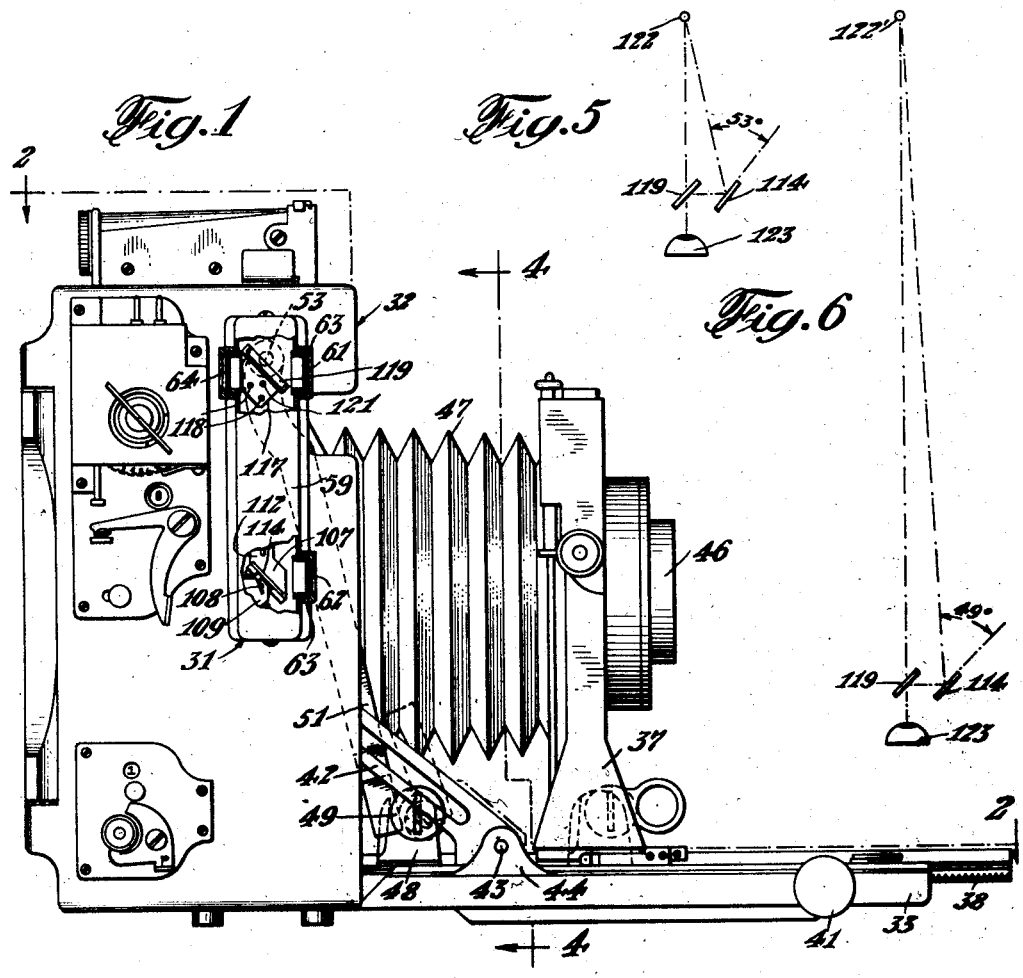
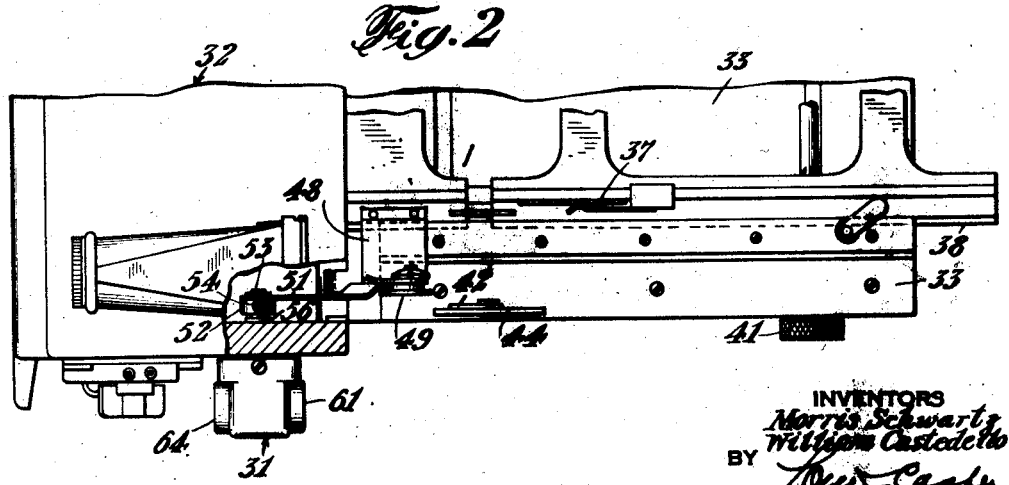

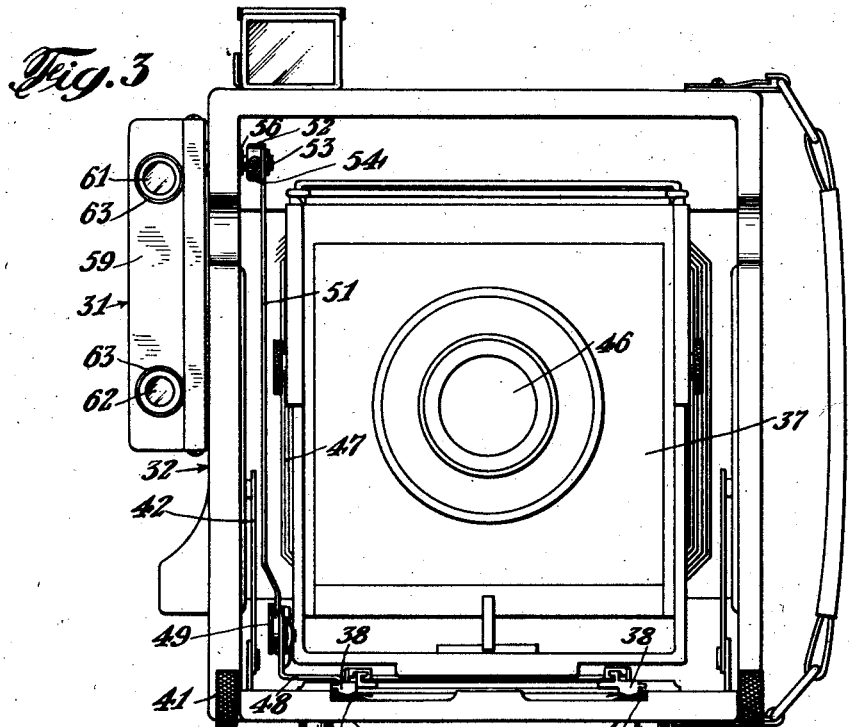
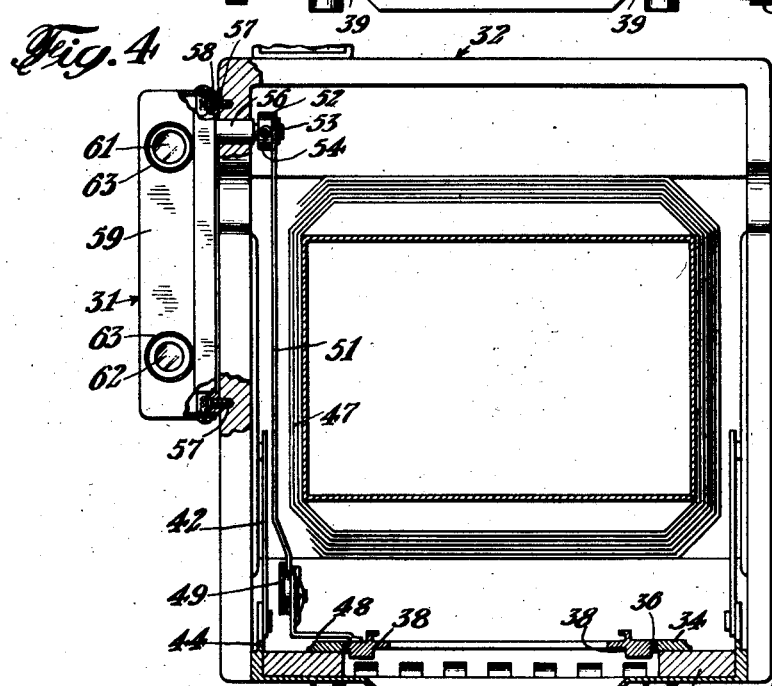

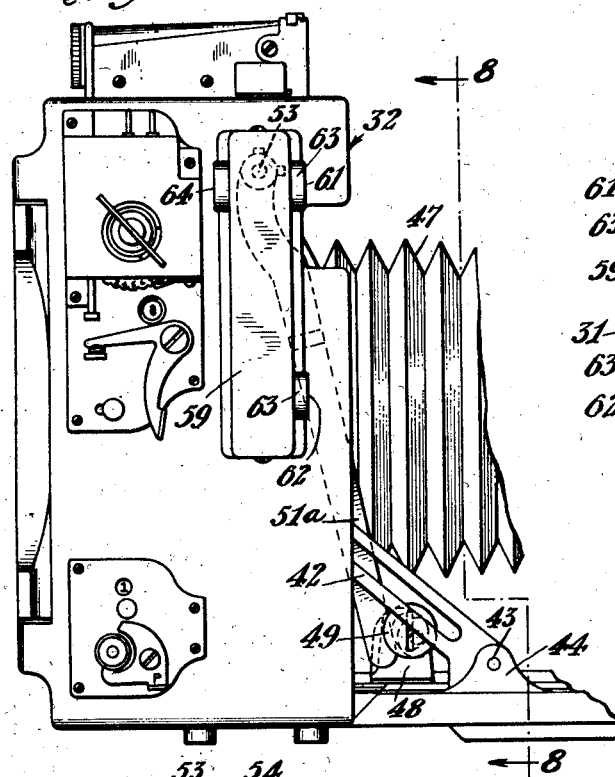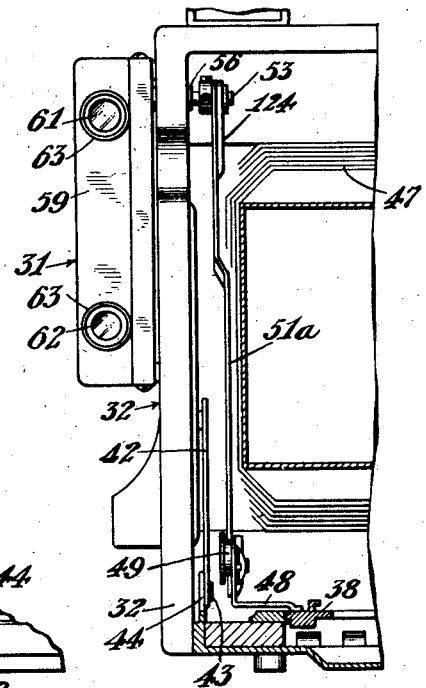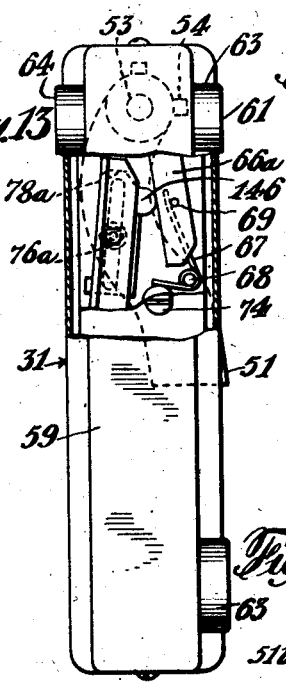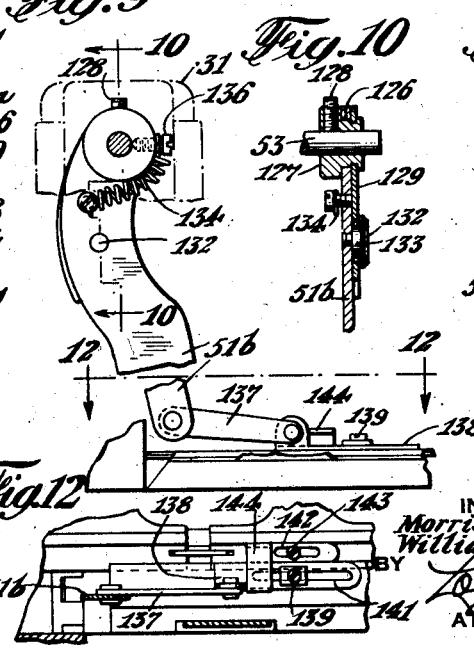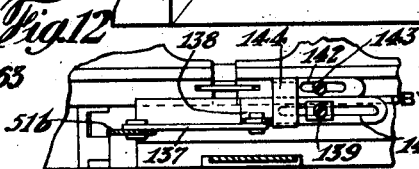

Patented May 29, 1945

2,376,982

UNITED STATES PATENT OFFICE 2,376,982

RANGE FINDER FOR CAMERAS

Morris Schwartz and William Castedello, Stamford, Conn., assignors to The Kalart Company, Inc., New York, N. Y., a corporation of New York Application November 10, 1941, Serial No. 418,516

8 Claims. (Cl. 95—44)

The present invention relates primarily to photographic devices and more particularly to an improved range finder or range finding devices which is attachable to a camera whereby the position or location of the camera objective lens relative to the light sensitive recording paper or negative may be properly located for objects at varying distances from the camera.

One of the primary objects of the present invention is to provide a photographic range finder of improved design which is compact, extremely accurate, and which may be easily and readily attached to a camera.

Another object of the invention is to provide a range finder which may be easily adjusted to adapt the same for use in connection with different cameras having objective lenses of different focal length or the same cameras with different lenses thereon.

A more specific object of the present invention is to provide an improved coupling between the movable objective lens mounting of the camera and the range finder.

Another object of the invention is to provide a coupling between the movable objective lens and the range finder whereby the objective lens may be moved for certain conditions without operating the range finder or disturbing the coupling between it and the lens.

A still further object of the invention is to provide an improved and simplified mechanism within the range finder for accurately operating the same.

Another still further object of the invention is to provide a simplified and easily made adjustment in a range finder whereby the same is adaptable for use with objective lenses having different focal lengths.

These and further objects of the invention will be more apparent in the following detailed description of the range finder when taken in conjunction with the accompanying drawings, in the latter of which:

Fig. 1 is a side elevational view of a camera in an open position with a range finder thereon embodying the principles of the present invention;

Fig. 2 is a fragmentary plan view partly in section of the camera and range finder taken substantially on line 2—2 of Fig. 1;

Fig. 3 is a front elevational view of the camera with the range finder attached;

Fig. 4 is a vertical sectional view taken substantially on line 4—4 of Fig. 1;

Figs. 5 and 6 are diagrammatic views illustrating the principles of operation of the range finder;

Fig. 7 is a view somewhat similar to Fig. 1 showing a modified coupling lever between the range finder and the movable element of the camera;

Fig. 8 is a sectional view taken substantially on line 8—8 of Fig. 7;

Fig. 9 is a side view of a second modified coupling lever;

Fig. 10 is a sectional view taken substantially on line 10—10 of Fig. 9;

Fig. 11 is a face view of the elements of Fig. 10;

Fig. 12 is a horizontal sectional view taken substantially on line 12—12 of Fig. 9;

Fig. 13 is a view of the range finder and the manner in which the same is operated by the coupling lever of Figs. 9, 10 and 11;

Fig. 14 is a front side view of the mounting plate of the range finder;

Fig. 15 is a left hand side view of the mounting plate and mounting frame of the range finder;

Fig. 16 is a right hand side view partly in section of the mounting plate and mounting frame of Fig. 14;

Fig. 17 is a view of the mounting frame taken substantially on line 17—17 of Fig. 15 showing the elements under the mounting plate;

Fig. 18 is a view taken substantially on line 18—18 of Fig. 16 showing the elements on the back side of the mounting plate and the manner in which the same cooperate with those on the mounting frame;

Fig. 19 is a view similar to Fig. 18 showing the elements of Fig. 18 in a different operated position;

Fig. 20 is a view showing the manner in which the elements on the back side of the mounting plate are mounted;

Fig. 21 is a detail view of an adjusting arrangement taken substantially on line 21—21 of Fig. 17;

Fig. 22 is a sectional view taken on line 22—22 of Fig. 14;

Fig. 23 is a sectional view taken on line 23—23 of Fig. 18;

Fig. 24 is a sectional view taken on line 24—24 of Fig. 14;

Fig. 25 is a sectional view taken on line 25—25 of Fig. 14; and

Fig. 26 is a sectional view taken on line 26—26 of Fig. 20.

Referring first to Figs. 1 and 2, the range finder is indicated in general by reference numeral 31 and is shown attached to the upper left hand side of a camera as viewed from the front, the camera being indicated generally by reference numeral 32. The camera is of a well known type such as a "Speed Graphic," and although the range finder is shown mounted on, and hereinafter described as operating in conjunction with this particular type of camera, it should be kept in mind that the application of the range finder is not limited to but a single camera or type of camera but may be used in conjunction with practically all types of cameras wherein the range finding and other problems hereinafter pointed out are present. The above type of camera has been chosen to illustrate the manner in which the range finder cooperates with the operating elements and as this camera is a well known type, only the arrangement and operation of the parts or elements which cooperate with or effect the operation of the range finder or are thought to be necessary for a complete understanding of the invention will be described.

The camera 32 is shown with the bed 33 in its open or extended position, and fixed thereto are tracks or guide rails 34, Fig. 4, which cooperate with sliding elements 36 to guide the objective lens holder 37 in its forward and backward movement. In order to make fine adjustments of the in and out movement of the objective lens, racks and pinions of the well known type are employed; the racks 38 are movable with the objective lens holder 37 and engage pinions 39. The pinions are rotated by means of knurled members 41 on either side of the camera bed 33. The camera bed is held in its open position by means of the arms 42 of well known type pivoted at 43 to brackets 44 on the camera bed.

The objective lens holder 37, Figs. 1 and 3, carries the objective lens 46 and has attached thereto the bellows 47. By moving the objective lens holder 37 backward and forward, the position of the lens 46 is changed so that it may be properly focused for objects at varying distances from the camera. The focusing of the camera on an object is a well known procedure and the theory involved will not be discussed.

Secured to the movable track element 36 of the camera so as to be movable with the objective lens holder 37 is a right angle bracket member 48. The bracket member 48 has an upwardly extending portion in the upper end of which is carried an eccentric shoulder screw 49. Engageable with the shoulder of the shoulder screw 49 is the lower end of a coupling lever 51 which operatively couples the range finder 31 to the movable part of the camera. The upper end of the coupling lever 51 is fixed for movement therewith to a hub 52 which in turn is secured to the inner end of a shaft 53. The hub 52 is fixed to the shaft 53 by means of set screws 54, best shown in Figs. 3 and 4. The shaft 53 extends through a sleeve bearing 56 forming a part of the range finder mounting plate 58 which is inserted in the side of the camera housing. The shaft 53 extends into the range finder 31 and as viewed in Fig. 1 it is biased so as to tend to rotate in a counter-clockwise direction by means hereinafter pointed out. The biasing means thus tends to keep the lower end of the coupling lever against the shoulder of the shoulder screw 49. The pivoting of the coupling lever 51 in a counter-clockwise direction is limited and therefore after the objective carrying member 37 is moved out beyond a certain point, the shoulder screw moves out of operative relation with the lower end of the coupling lever. The limit of the movement of the lower end of the coupling lever 51 is shown by the dot-dash outline thereof in Fig. 1, and the movement of the shoulder screw 49 beyond this point or to some point such as that shown by the dotted outline thereof, disengages the same from the coupling lever. However, as the objective carrying member 37 moves toward the left, the shoulder screw re-engages the coupling lever 51 in its extreme position and controls the range finder in accordance with its movement from the time it engages the lever to its inwardmost position. The eccentricity of the shoulder screw 49 permits the adjustment thereof to properly line up the range finder as hereinafter pointed out.

The shoulder screw 49 movable with the objective lens carrying member 37 does not move out of engagement with the coupling lever 51 until the camera is focused on an object about two and a half feet or less away from the camera and the range finder is effective to determine ranges from this distance to infinity as the lens is moved toward the camera. Heretofore range finders were limited to determining distances not less than from six to eight feet and a range finder such as the one described herein whereby distances up to less than two and a half feet may be accurately determined has considerable more utility than those unable to function as such short ranges.

The range finder 31 is attached by screws such as 57 to the side of the camera and includes the mounting frame 58, Fig. 4, to which is also attached a cover or housing 59. On the front side of the range finder cover 59, as shown in Figs. 3 and 4, is an upper and a lower circular window 61 and 62 respectively. The windows are secured in the case by collars such as 63 in the well known manner. Located on the left hand side of the cover 59, as shown in Fig. 1, in line with the upper window 61 is a third window 64. The detailed manner in which an operator employing the range finder looks through the window 64 and observes an image sighted through the windows 61 and 62 and positions the objective carrying member 37 for the proper focus of the distant object will be described in the following paragraphs.

The inner end of the shaft 53, as shown in Figs. 16, 17, 18 and 19, has fixed thereto for movement therewith an arm 66. The movement of the arm 66 is somewhat limited and a spring 67 coiled about a post 68 cooperates with a pin 69 in the arm 66 and normally tends to pivot the same in a counter-clockwise direction as viewed in Fig. 17. The spring 67 tending to pivot the arm 66 which is fixed to the shaft 53 normally keeps the lower end of the coupling lever 51 fixed to the other end of the shaft 53 against the shoulder screw 49 movable with the objective lens carrier 37. The engagement of the right hand side of the arm 66 with the side flanged section 71 of the mounting frame 58 limits the pivotal movement thereof and after the shoulder screw 49, Fig. 1, has moved forward far enough to permit engagement of the arm with the section 71, further outward movement of the shoulder screw does not affect the range finder. During the leftward movement of the objective lens carrer 37, the shoulder screw 49 re-engages the lower end of the coupling lever 51 to control the range finder in accordance with the movement of the lens. The advantage of providing a one-way connection between the range finder and the movable objective lens carrier 37 whereby after the objective lens 46 has been moved a predetermined amount it no longer affects the operation of the range finder, will be apparent in the following paragraphs.

Arranged to be mounted on the mounting frame 58 of the range finder is a mounting plate 72, Figs. 14, 15, 16 and 20. The mounting plate 72 is located by means of dowel pins 73 relative to the mounting frame 58 and it is attached to the mounting frame by a screw 74. The mounting plate carries several of the movable elements of the range finder and these elements will now be described.

Pivotally supported on a shoulder screw 75 adjacent the center of the mounting plate 72 is a pivot lever 76. As shown, the pivot lever 76 is supported in a sustantially vertical position, and clamped to the upper end thereof by means of a clamping screw 77 is a movable member 78. The movable member 78 has a slot 79 therein which permits adjustment thereof along the length of the pivot lever 76. The movable member 78 has flange sections 81 and 82 bent part way around the lever 76 to prevent pivoting thereof relative to the lever when the clamping screw 77 is loosened. Fixed to the section 82 by some means such as by soldering is a single spring member 83 which has a semicircular section 84 adjacent the upper end thereof in contact with the arm 66. The spring member 83 is relatively strong and normally does not flex during operation of the range finder, it being provided to permit a little pivoting of the arm 66 in a clockwise direction after the same has caused the pivoting of the pivot lever 76 to its extreme position as shown in Fig. 19. The flexing of the member 83 may occur when the objective lens carrier is moved into the camera housing before closing the same. The upper end of the spring member is biased so as to press against the upper end of the section 82, as shown in Fig. 19, and stays in contact with the section 82 during normal operation of the range finder.

The circular section 84 of the spring member 83 engages the left hand side of the arm 66 as shown in Figs. 18 and 19, and the movement of the arm 66 causes the pivot lever 76 to pivot therewith. A spring hereinafter described is provided to hold the section 84 in engagement with the left hand side of the arm 66. By loosening the screw 77, the member 78, Fig. 20, may be moved along the upper end of the pivot lever 76 and accordingly change the point where the curved section 84 of the spring 83 contacts the side of the arm 66. By this arrangement the amount of pivoting of the pivot lever 76 for a given amount of pivoting of the arm 66 may be varied. This adjustment along with others adapts the range finder for use in conjunction with various lenses having different focal lengths and various cameras.

The pivot lever 76 has adjacent the lower end thereof, as shown in Figs. 18 and 19, a rightwardly extending projection 86 which cooperates with a surface 87 on a small keystone-shaped member or segment 88. The segment 88 is pivotally mounted on a shoulder screw 89 and has a notch 91 therein in which is located the lower end of a wedge member 92. The lower end of the wedge member 92 is held in the notch 91 by a spring 93 anchored at 94 and attached to a pin 95 in the wedge member. The spring 93 exerts a downward force on the wedge member 92 and thereby tends to pivot the segment 88 and pivot lever 76 in clockwise directions. The wedge 92, as shown in Figs. 18 and 19, has a straight surface 96 thereon which during movement thereof cooperates with the inner end of a screw 97. The screw 97 is carried in a small adjustable plate 98, best shown in Fig. 21, which as shown is movable within predetermined limits in a vertical plane. A notch 99 is formed in the flange 71 of the mounting frame 58 to permit adjustment of the plate 98 up and down together with the screw 97 carried therein. A single wire spring 101 holds the plate in position and prevents the same from moving by itself.

On the left hand side of the wedge 92, as shown in Figs. 18 and 19, is a sloping or beveled surface 102. In operative relation with the eveled surface 102 is a pin 103 extending through a slot 104, Figs. 14 and 20, in the mounting plate 72. The pin 103 is carried on the upper end of an arm 106 of a bracket member 107. The bracket member 107, best shown in Fig. 25, is pivotally supported on trunnion screws 108 carried in a bracket 109 attached to the lower end of the mounting plate 72 by screws such as 111. Parallel with the arm 106 on the bracket member 107 is a second arm 112 which carries in the upper end thereof a screw 113. The arm 106 is somewhat flexible whereas the arm 112 is more rigid and by adjusting the screw 113 the arm 106 may be flexed within certain limits. This adjustment permits lining up of the range finder.

The bracket member 107 has fixed thereto a small surface mirror 114 positioned roughly on a 45° angle. The mirror 114 operates in a manner hereinafter pointed out to pivot with the inward and outward movement of the objective lens. A spring 116 anchored in the bracket 109, Figs. 14 and 15, exerts a force on the bracket member 107 tending to pivot the same in a clockwise direction. This force holds the pin 103 on the upper end of the arm 106 in engagement with the beveled surface 102 of the wedge member 92.

From the arrangement of the above described elements it is obvious that as the arm 66 pivots in conjunction with the inward and outward movement of the camera objective lens within certain limits, the lever 76 and segment 88 also pivot. The movement of the segment 88 moves the wedge 92 up and down and the beveled surface 102 of the wedge moving up and down and engaging the pin 103 causes the bracket member 107 to pivot first in one direction and then in the other, depending upon the direction of movement of the objective lens either to or away from the camera housing. The pivoting of the bracket member 107 also pivots the mirror 114 attached thereto and the amount of pivoting of the mirror 114 for a given amount of movement of the camera objective lens is dependent upon the point where the section 84 of the member 83 contacts the side of the arm 66 together with the position of the screw 97 in the plate 98, and its point of contact on the surface 96 of the wedge member 92. The sloping surface 102 on the wedge 92 and the proportions of the elements including the arm 66, the pivot lever 76, the segment 88 and the wedge 92, are such that for a given set of adjustments the movement of the mirror 114 is according to a predetermined relationship relative to the focal length of the camera objective lens and the distance the lens is from the camera housing. The above mentioned adjustments including the movable plate 98 and the slidable member 78 permit the operating characteristics of the range finder to be adjusted so as to permit the range finder to be used in conjunction with different lenses or those having different focal lengths.

A bracket 117, Figs. 1, 14, 15 and 16, is attached by screws 118 to the upper part of the mounting plate 72. The bracket 117 is open in the back, as shown in Fig. 15, and holds a silver-flecked mirror 119. The mirror 119 is semipervious to light or of the type which permits vision therethrough while at the same time serving as mirror. An adjusting screw 121, Fig. 24, is threaded in the bracket 117 and by means of the screw 121 the bracket may be flexed within predetermined limits to change the position of the mirror on the mounting plate 72 to properly align the same.

As shown in Fig. 1, the silver-flecked mirror 119 is disposed between the windows 61 and 64 while the movable mirror 114 is opposite the lower window 62. In using the range finder an object is sighted through the window 64, the silver-flecked mirror 119 and the upper front window 61. A second image of the object to be photographed is reflected from the movable mirror 114 to the back side of the silver-flecked mirror 119 and then to the eye. When these two images, the one sighted directly and the one reflected from the movable mirror 114, are superimposed one upon the other, and the range finder properly adjusted in accordance with the objective lens of the camera, the camera is in proper focus.

Figs. 5 and 6 illustrate diagrammatically the manner in which the range finder works. In Fig. 5 an object 122 relatively close to the camera is viewed from the eye 123 through the silver-flecked mirror 119 and with the camera in proper focus, an image of the same object is reflected from the movable mirror 114 and the back side of the silver-flecked mirror and superimposed on the image of the object directly viewed. In Fig. 6 a more distant object 122' is viewed in the same manner and to superimpose the two images the angle of the movable mirror 114 must be different from what it is when an object relatively near is viewed.

When the range finder is properly adjusted on a camera in accordance with the focal length of the objective lens, the turning of the knob 41, Fig. 1, moves the objective lens carrier 37 and operates the range finder 31 so that when the two images are superimposed the camera is in the proper focus. In adjusting the range finder to a given individual lens, the movable member 78 and the plate 98 are set at given points on scales 115 and 120, respectively, in accordance with a table of adjustments for a particular lens and the camera lens carrier 37 is set at its infinity stop. The shoulder screw 49 is then adjusted to bring the two images as viewed through the range finder into coincidence. The camera focus is then checked at objects varying distances away on a ground glass and if in the range finder the two images are not perfectly superimposed, finer adjustments of the members 78 and 98 are made to bring the two images into coincidence. The finer adjustments compensate for slight variation in focal lengths of lenses which may vary from the focal length marked by the manufacturer on the lens casing. The feature of enabling the range finder to be adjusted to compensate for differences between the actual focal length of a lens and the focal length marked on the lens casing by so shaping and proportioning the movable elements in the range finder is of great importance especially when focusing the camera at objects in the neighborhood of two or three feet from the camera. At such close distances the focusing is very critical and a lens slightly out of focus gives poor results. Thus the range finder may be adjusted to exactly synchronize with the focal length of an individual lens which is an important advantage obtainable with the range finder of the type described.

Figs. 7 and 8 show a camera 32 of the same type as that shown in Fig. 1 associated with a modified coupling lever 51a. The coupling lever 51a has a reinforced portion 124 at its upper end which prevents undesirable flexing of the coupling lever. The reinforced portion 124 assists in insuring proper engagement of the lower end of the coupling lever 51a with the shoulder screw 49. The coupling lever 51a is also bent differently than the coupling lever 51, Fig. 3, which may be necessary to clear various elements of the camera.

Figs. 9 to 13 show a still further modified coupling lever 51b which has certain advantages over the previously described coupling lever. The coupling lever 51b is pivotally carried at its upper end of a shoulder 126 formed on a collar 127. The collar 127 is fixed to the operating shaft 53 of the range finder by set screws such as 128 and fixed to the collar 127 for movement therewith is an arm 129. The arm 129 is relatively short and has a square hole 131 therein through which extends a shoulder screw 132 threaded into the coupling lever 51b. The shoulder 133 of the shoulder screw 132 is eccentric and by means of adjusting the same, the relative position of the arm 129 and the coupling lever 51b may be changed. The shoulder 133 on screw 132 is somewhat smaller than the square opening 131 in the arm 129 and movement of the arm relative to the coupling lever within certain limits is permitted. A spring 134 is attached to the coupling lever 51b and a screw 136 in the collar 127 and tends to pivot the lever 51b and arm 129 in opposite directions to keep the left hand side of the square opening 131, as shown in Fig. 11, against the shoulder 133.

The lower end of the coupling lever 51b has pivotally attached thereto a link 137 which in turn is pivotally attached to an upwardly extending projection of a slidable member 138 on the camera bed. The slidable member 138 is movable within certain limits back and forth along the camera bed being guided in this movement by means of a shoulder screw 139 extending through a slot 141 in the member 138. Adjustably attached to the movable rack of the camera by a screw 143 is an L-shaped bracket 142. The horizontal portion 144 from the L-shaped bracket 142 extends in the path of movement of the upwardly extending arm of the movable member 138 and controls up to the limit of the slot 141 the outward movement of the movable member 138. When the rack is moved outward a predetermined distance, the arm 144 moves out of operative relation with the upwardly extending part of the movable member 138 and from then on the movement of the objective lens carrier is independent of the member 138 and therefore beyond this point has no further effect upon the coupling lever 51b. As the rack is moved in a backward direction from its most advanced position, the section 144 of the bracket 142 re-engages the slidable member 138 to control the range finder in accordance with the position of the objective lens. The above arrangement of the modified coupling lever is to be preferred for certain installations over that described in the preferred embodiment.

With a coupling lever such as that shown in Figs. 9 to 13, the spring 134 takes up the motion of the lower end of the coupling lever 51b as the objective lens is moved back into the camera preparatory to closing the same. With such a coupling lever the upper end of the operating lever 76a, Fig. 13, may have thereon a slidable member 78a with a projection 146 formed integrally therewith which engages the left hand side of the arm 66a. The spring 134 serves as a take-up in the modification shown in Figs. 9 to 13 instead of the flexible member 83, Figs. 18 to 20 of the preferred embodiment when the objective lens carrier is reset into the camera housing. Thus the operative control of the range finder is effected only through a predetermined part of the movement of the objective lens carrier and the obvious advantages of such arrangements are attained.

It is obvious, of course, that various other modifications of the apparatus shown and described herein may be made without departing from the spirit or essential attributes of the invention and it is desired, therefore, that only such limitations be placed thereon as are imposed by the prior art or are specifically set forth in the appended claims.

What is claimed as new and desired to be secured by Letters Patent of the United States is:

1. In combination, a camera having a casing and a focusing lens movable relative to said casing, a range finder attached to said camera casing for determining the proper position of said focusing lens relative to said camera casing for properly focusing the same on objects various distances from said camera, a pivoted coupling lever extending between said movable lens and said range finder and pivotable at a predetermined rate relative to the rate of movement of said lens relative to said camera casing, an arm in said range finder pivoted by said coupling lever, a first lever in said range finder pivoted by said arm, a first adjustable means interposed between said arm and said first lever for varying the amount of pivoting of said lever for a given amount of pivoting of said arm, a second lever pivotable at a predetermined rate for a given rate of pivoting of said first lever, a movable wedge member operatively moved by said second lever, a pivotable mirror, means controlled by the wedging action of said wedge member for pivoting said mirror, a second adjustable means for adapting said wedge member to pivot said mirror varying amounts and rates for given amounts and rates of movement of said second lever, and means including said coupling lever, said arm, said first lever, said second lever and said wedge member for pivoting said mirror in accordance with the focusing movement of said lens.

2. In combination, a camera having a casing and a focusing lens movable relative to said casing, a range finder attached to said camera casing for determining the proper position of said focusing lens relative to said camera casing for simultaneously focusing the same on objects various distances from said camera, a pivoted coupling lever extending between said movable lens and said range finder and pivotable at a predetermined rate relative to the rate of movement of said lens relative to said camera casing, an arm in said range finder pivoted by said coupling lever, a first lever in said range finder pivoted by said arm, a first adjustable means interposed between said arm and said lever for varying the amount of pivoting of said lever for a given amount of pivoting of said arm, a second lever pivotable at a predetermined rate for a given rate of pivoting of said lever, a movable wedge member operatively moved by said second lever, a pivotable mirror, means controlled by the wedging movement of said wedge member for pivoting said mirror, a second adjustable means for adapting said wedge member to pivot said mirror varying amounts and rates for given amounts and rates of movement of said second lever, means including said coupling lever, said arm, said first lever, said second lever and said wedge member for pivoting said mirror in accordance with the focusing movement of said lens, and means including said first and second adjustable means for enabling the pivoting of said mirror in accordance with the focusing movement of lenses having different focal lengths.

3. The combination of a camera having a casing and a focusing lens movable relative to said casing with a range finder attached to said camera casing for determining the proper position of said focusing lens relative to said camera casing for properly focusing the same to take pictures of objects various distances from said camera, a pivoted coupling lever extending between said movable lens and said range finder and pivotable in a predetermined manner relative to a predetermined part of the movement of said lens toward and away from said camera casing, an arm in said range finder pivotable with said coupling lever, a first lever in said range finder pivoted by said arm, a first adjustable means interposed between said arm and said lever for varying the degree of pivoting of said lever for a given amount of pivoting of said arm, a second lever pivotable in a predetermined manner relative to the pivoting of said first lever, a movable wedge member operatively moved by said second lever, a pivotable mirror, means controlled by the wedging movement of said wedge member for pivoting said mirror, a second adjustable means for changing the wedging action of said wedge member to move said mirror varying amounts and rates for given amounts and rates of movement of said second lever, means including said coupling lever, said arm, said first lever, said second lever and said wedge member for pivoting said mirror in accordance with the focusing movement of said lens and means for changing the said predetermined part of the movement of said lens in which said coupling lever is moved in said predetermined manner.

4. The combination of a camera having a casing and a focusing lens movable relative to said casing with a range finder attached to said camera casing for determining the proper position of said focusing lens relative to said camera casing for properly focusing the same to take pictures of objects various distances from said camera, a pivotable coupling lever extending between said movable lens and said range finder and pivotable at a predetermined rate relative to the rate of movement of said lens during a predetermined portion of said movement away from and toward said camera casing, an arm in said range finder pivotable with said coupling lever, a first lever in said range finder pivoted by said arm, a first adjustable means adjustable along the length of said lever and interposed between said arm and said lever for varying the amount of pivoting of said lever for a given amount of pivoting of said arm, a second lever pivotable at a predetermined rate for a given rate of pivoting of said first lever, a movable wedge member the wedging movement of which is operatively controlled by said second lever, a pivotable mirror, means controlled by said wedge member for pivoting said mirror, a second adjustable means for changing a bearing point of said wedge member to adapt the same to move said mirror varying amounts for given amounts of movement of said second lever, means including said coupling lever, said arm, said first lever, said second lever and said wedge member for pivoting said mirror in accordance with the focusing movement of said lens, and means including said first and second adjustable means for enabling the pivoting of said mirror in accordance with the focusing movement of lenses having different focal lengths.

5. In combination, a camera having a casing and a focusing lens on a support movable relative to said casing, a range finder attached to said camera casing, said range finder being used for determining the proper position of said focusing lens relative to said camera casing for properly focusing the same on objects various distances from said camera, said range finder including a pivotable coupling member for operating said range finder and having a one-way connection with said lens support, means including said one-way connection for pivoting said coupling member only through a predetermined part of the movement of said lens support, an arm pivotable with said coupling member, a pivotable first lever having a first part and a second part, said first part being in operative relation with said arm, an adjustable member on said first part for varying the effective lengths of said first part of said lever and said arm whereby said lever is pivotable variable amounts for a given amount of pivoting of said coupling member, a second lever engageable with and pivotable by said second part of said first lever, a wedge movably controlled by said second lever, a stationary bearing point for said wedge, a movable mirror, a member operated by the wedging action of said wedge for moving said mirror, means including said coupling lever, said arm, said first lever, said second lever, said wedge and said member operated by said wedge for moving said mirror in a predetermined manner relative to the focal length of said lens and the focusing movement thereof.

6. The combination as claimed in claim 5 and including the means for varying the effective length of the first part of said lever and said arm and for changing the position of the bearing point for said wedge for moving said mirror in a predetermined manner relative to the focal length and focusing movement of lenses having different focal lengths.

7. The combination as claimed in claim 5 and including a resilient member interposed between said arm and the first part of said lever which after a given amount of pivoting of said lever by said arm permits further pivoting of said arm independent of said lever.

8. The combination as claimed in claim 5 and including a resilient member interposed between said coupling lever and said arm which only after a predetermined amount of pivoting of said coupling lever in one direction permits further pivoting of the same independent of said arm.

MORRIS SCHWARTZ.
WILLIAM CASTEDELLO.